United States Patent
Ye et al.

(10) Patent No.: US 8,817,879 B2
(45) Date of Patent: Aug. 26, 2014

(54) TEMPORAL ERROR CONCEALMENT FOR VIDEO COMMUNICATIONS

(75) Inventors: Yan Ye, San Diego, CA (US); Gokce Dane, San Diego, CA (US); Yen-Chi Lee, La Jolla, CA (US); Ming-Chang Tsai, San Diego, CA (US); Nien-Chung Feng, Santa Clara, CA (US); Karl Ni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 12/694,522

(22) Filed: Jan. 27, 2010

(65) Prior Publication Data

US 2010/0118970 A1 May 13, 2010

Related U.S. Application Data

(62) Division of application No. 11/022,362, filed on Dec. 22, 2004, now abandoned.

(51) Int. Cl.
*H04N 7/50* (2006.01)
*H04N 7/36* (2006.01)

(52) U.S. Cl.
CPC .......... *H04N 7/50* (2013.01); *H04N 19/00684* (2013.01)
USPC .................. 375/240.16; 375/240.01; 382/232

(58) Field of Classification Search
CPC .............. H04N 7/50; H04N 19/00684; H04N 19/00581
USPC ..................................... 375/240.16
See application file for complete search history.

(56) References Cited

U.S. PATENT DOCUMENTS

| | | | |
|---|---|---|---|
| 5,621,467 A * | 4/1997 | Chien et al. | 375/240.15 |
| 5,737,022 A | 4/1998 | Yamaguchi et al. | |
| 7,336,720 B2 * | 2/2008 | Martemyanov et al. | 375/240.12 |
| 2003/0012280 A1 * | 1/2003 | Chan | 375/240.16 |
| 2003/0081681 A1 * | 5/2003 | Ghanbari et al. | 375/240.16 |
| 2004/0141555 A1 | 7/2004 | Rault et al. | |
| 2005/0078751 A1 | 4/2005 | Ghanbari et al. | |
| 2006/0133495 A1 * | 6/2006 | Ye et al. | 375/240.16 |

FOREIGN PATENT DOCUMENTS

| | | |
|---|---|---|
| EP | 0727910 A2 | 8/1996 |
| EP | 1301044 A1 | 4/2003 |
| EP | 1395061 | 3/2004 |
| JP | 11122621 | 4/1999 |
| JP | 2003199113 | 7/2003 |
| JP | 200496752 | 3/2004 |
| WO | WO2004064401 | 7/2004 |

OTHER PUBLICATIONS

Kim, et al. (1996) Block motion estimation based on spatio-temporal correlation. IEEE Tencon, XP 10236811A1, pp. 955-960.
Ghanbari, S., et al. (2002) A cluster based method for the recovery of the lost motion vectors in video coding. IEEE, XP 10611915A1, pp. 583-586.
International Search Report and Written Opinion—PCT/US2005/046739—ISA/EPO—May 11, 2006.
Taiwan Search Report—TW094145929—TIPO—Mar. 9, 2012.

* cited by examiner

*Primary Examiner* — Jessica Roberts
(74) *Attorney, Agent, or Firm* — Steven Thiel; Todd E. Marlette (57) ABSTRACT

Methods and systems for processing video data are described. A set of candidate motion vectors is selected from motion vectors associated with macroblocks in a first frame of video data and from motion vectors associated with macroblocks in a second frame of the video data. A statistical measure of the set is determined. The statistical measure defines a motion vector for a macroblock of interest in the second frame.

20 Claims, 7 Drawing Sheets

TEMPORAL ERROR CONCEALMENT FOR VIDEO COMMUNICATIONS

PRIORITY

The present application for patent is a divisional of patent application Ser. No. 11/022,362 entitled "TEMPORAL ERROR CONCEALMENT FOR VIDEO COMMUNICATIONS" filed Dec. 22, 2004, pending, and assigned to the assignee hereof and hereby expressly incorporated by reference herein.

FIELD

Embodiments of the present invention pertain to the processing of multimedia data, and in particular to the decoding (decompressing) of video data.

BACKGROUND

Media systems transmit media data, such as video data, over wired and/or wireless channels. Data transmitted over such channels may be lost or corrupted or may experience delays along the way, perhaps arriving late at its destination. Late or lost data can be particularly troublesome for video data that are predictively encoded (compressed) using techniques such as but not limited to MPEG (Moving Pictures Experts Group) encoding. Predictive encoding introduces dependencies in the encoded data, so that the decoding of some data depends on the decoding of other data. While predictive encoding generally improves the amount of compression, it can also result in error propagation should data relied on for the decoding of other data be lost or arrive late. Any late or lost data can impact the quality of the reconstructed (decoded or decompressed) video data. However, the impact can be aggravated if the lost or late data is part of a reference frame used for motion compensated prediction because errors will propagate to other frames that are dependent on the reference frame.

For instance, consider a moving object that appears in different positions in successive frames of video data. Using predictive encoding techniques, the object is described by data in the first frame, but in the second frame the object is described using a motion vector that describes how the object moved from the first frame to the second frame. Thus, only the data for the motion vector needs to be transmitted in the second frame, improving the amount of compression because the data describing the object does not need to be retransmitted. However, if the motion vector is not received, then the object cannot be properly rendered when the second frame is reconstructed into a video image, thus reducing the quality of the reconstructed video. Subsequent frames in which the object appears may also be affected, because they may depend on proper placement of the object in the second frame.

To alleviate the impact of absent (e.g., missing, lost, late or incorrectly received) data on the quality of the reconstructed video, a video decoder can apply an error recovery (e.g., error concealment) process to the received data. Studies have shown that the quality of the reconstructed video can be significantly improved if motion vectors can be recovered (e.g., estimated). Temporal error concealment improves the quality of the reconstructed video by estimating missing or incorrectly received motion vectors in a current frame using properly received information from the current frame and/or preceding frames. In other words, a goal of temporal error concealment is to estimate motion vectors using their spatial as well as temporal associates.

Conventional temporal error concealment techniques are based in the pixel domain. Consider a frame (the current frame) in which a motion vector associated with an area (e.g., a macroblock of interest) in the frame is missing. A set of motion vectors is formed by selecting motion vectors associated with macroblocks that surround the macroblock of interest in the current frame and motion vectors associated with macroblocks that surround the co-located macroblock in the reference frame (the co-located macroblock is the macroblock that is at the same position in the reference frame as the macroblock of interest is in the current frame). With a pixel-domain approach, a measure of distortion is calculated for each of the motion vectors in the set. To evaluate the distortion, pixel values are taken from the reconstructed frame buffer. In a motion select technique, the motion vector that minimizes the distortion measure is chosen as the replacement for the absent motion vector. In a motion search technique, a search for a motion vector that minimizes the distortion measure is performed within, for example, a 3×3 window of macroblocks.

Pixel-domain error concealment is problematic because it is computationally complex and time-consuming. Evaluating the distortion for each potential motion vector can require a large number of computations, consuming computational resources and causing delays in the decoding process. Pixel-domain error concealment is most effective when performed after the decoder has finished decoding a frame; hence, the delay introduced by error concealment in the pixel domain may be equivalent to one frame duration. Furthermore, accessing the reconstructed frame buffer to retrieve pixel values for the distortion evaluation takes time, which adds to the delays.

Accordingly, a method and/or system that can reduce computational complexity and decoding delays would be desirable.

SUMMARY

Methods and systems for processing video data are described. In one embodiment, a set of candidate motion vectors is selected from motion vectors associated with macroblocks in a first frame of video data and from motion vectors associated with macroblocks in a second frame of the video data. In one embodiment, the first frame precedes the second frame in order of display. A statistical measure of the set is determined. For example, the average or the median of the candidate motion vectors can be determined. The statistical measure defines a motion vector for a macroblock of interest in the second frame.

Various methods can be used to select the candidate motion vectors. The selection of the candidate motion vectors and the determination of a replacement motion vector are performed in the motion vector domain instead of the pixel domain. Consequently, computational complexity and latency are reduced. As an additional benefit, hardware modifications are not required.

DETAILED DESCRIPTION

In the following detailed description, numerous specific details are set forth in order to provide a thorough understanding of the concepts presented herein. However, it will be recognized by one skilled in the art that embodiments of the invention may be practiced without these specific details or with equivalents thereof. In other instances, well-known methods, procedures and components have not been described in detail as not to unnecessarily obscure aspects of these embodiments.

Some portions of the detailed descriptions, which follow, are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system or similar electronic computing device. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present embodiments, discussions utilizing terms such as "selecting" or "determining" or "comparing" or "counting" or "deciding" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In one embodiment, a computer-usable medium that has computer-readable program code embodied therein is implemented. A computer system can include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Figure 1:
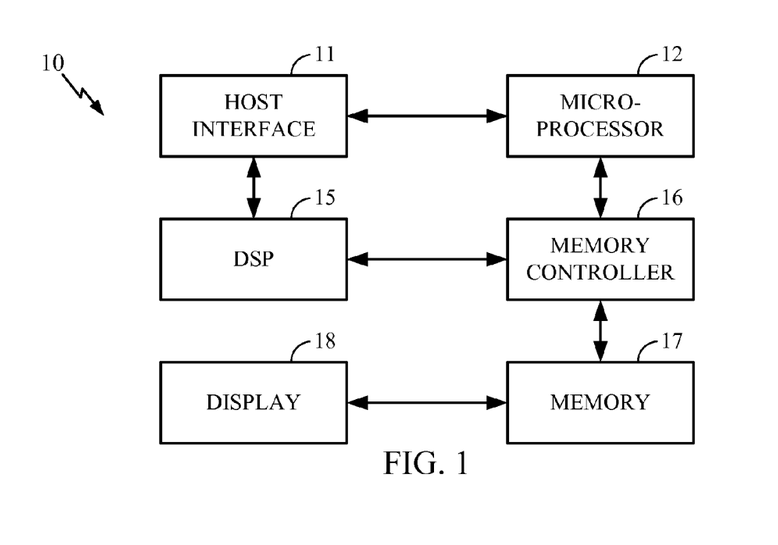
FIG. 1 is a block diagram of one example of a system for decoding video data.

FIG. 1 is a block diagram of an example of a system 10 upon which embodiments may be implemented. The system 10 shows the components of an execution platform for implementing certain functionality of the embodiments. As depicted in FIG. 1, the system 10 includes a microprocessor 12 (e.g., an Advanced Reduced Instruction Set Computer Machine, or ARM, processor) coupled to a digital signal processor (DSP) 15 via a host interface 11. The host interface 11 translates data and commands passing between the microprocessor 12 and the DSP 15 into their respective formats. In the present embodiment, both the microprocessor 12 and the DSP 15 are coupled to a memory 17 via a memory controller 16. In the system 10 embodiment, the memory 17 is a shared memory, whereby the memory 17 stores instructions and data for both the microprocessor 12 and the DSP 15. Access to the shared memory 17 is through the memory controller 16. The shared memory 16 also includes a video frame buffer for storing pixel data that drives a coupled display 18.

As described above, certain processes and steps of the embodiments are realized, in at least one embodiment, as a series of instructions (e.g., a software program or programs) that reside within computer-readable memory (e.g., memory 17) of a computer system (e.g., system 10) and are executed by the microprocessor 12 and DSP 15 of system 10. When executed, the instructions cause the system 10 to implement the functionality of embodiments as described below. In another embodiment, certain processes and steps of the present invention are realized in hardware.

The descriptions and examples provided herein are discussed in the context of video-based data (also referred to as media data or multimedia data or content), but the present invention is not so limited. For example, embodiments may also be used with image-based data, Web page-based data, graphic-based data and the like, and combinations thereof.

Embodiments of the present invention can be used with Moving Pictures Experts Group (MPEG) compression (encoding) schemes such as MPEG-1, MPEG-2, MPEG-4, and International Telecommunication Union (ITU) encoding schemes such as H.261, H.263 and H.264; however, the present invention is not so limited. In general, embodiments can be used with encoding schemes that make use of temporal redundancy or motion compensation—in essence, encoding schemes that use motion vectors to increase the amount of compression (the compression ratio).

Figure 2:
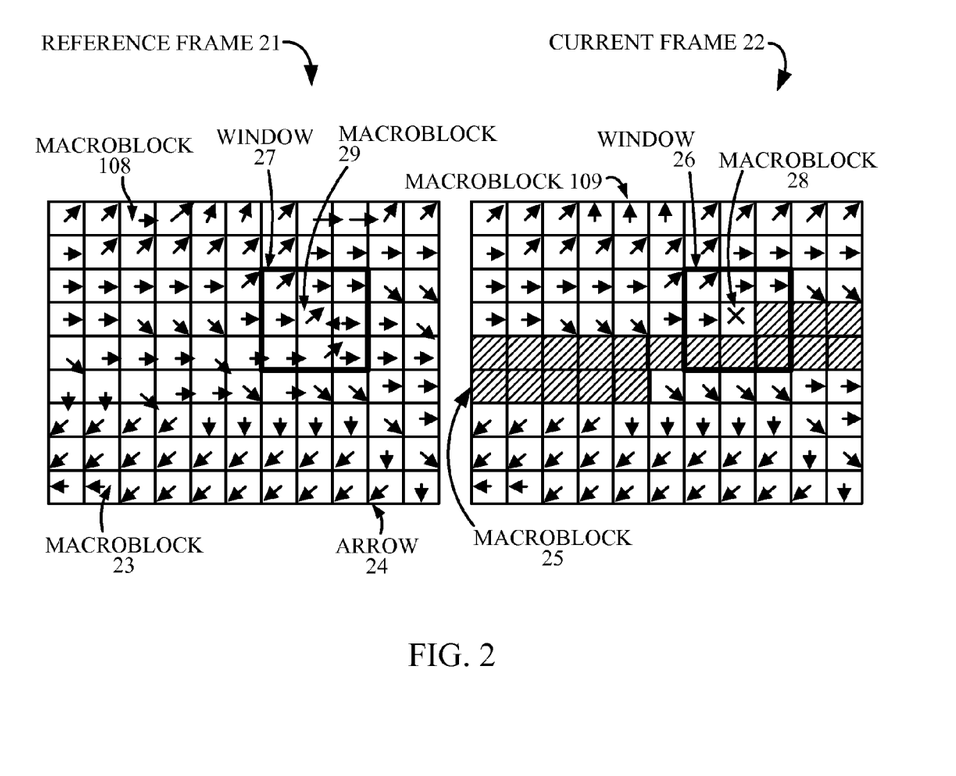
FIG. 2 illustrates an example of two frames of image data organized as macroblocks.

FIG. 2 illustrates an example of two frames 21 and 22 of image or video data. In the example of FIG. 2, the frame 21 (also referred to herein as the first frame or the reference frame) precedes the frame 22 (also referred to herein as the second frame or current frame) in display order. Each of the frames 21 and 22 is organized as a plurality of macroblocks, exemplified by the macroblock 23. In one embodiment, a macroblock has dimensions of 16 pixels by 16 pixels; however, the present invention is not so limited—macroblocks can have dimensions other than 16×16 pixels. Although FIG. 2 shows a certain number of macroblocks, the present invention is not so limited.

In the example of FIG. 2, a motion vector is associated with each macroblock. A motion vector has a dimension that describes its length (magnitude) and a dimension that describes its direction (angle). A motion vector may have a magnitude of zero. For purposes of illustration, a motion vector that is properly received at a decoder is represented herein as an arrow (e.g., arrow 24) within a macroblock. Macroblocks (e.g., macroblock 25) for which an associated motion vector was not properly received are indicated in FIG. 2 by shading. The frame 22 also includes a macroblock 28 of interest, indicated by an "X," where a motion vector was not properly received. A motion vector may not be properly received if the data describing the motion vector is late, corrupted or missing.

As indicated in FIG. 2, there may be instances in which motion vectors for several macroblocks (that is, a slice of macroblocks consisting of one or more consecutive macroblocks) are not properly received. As will be seen, according to the embodiments, a motion vector can be estimated for each macroblock in the slice for which a motion vector was not properly received. However, in general, a motion vector can be estimated for any macroblock where there is a desire to do so.

In one embodiment, to estimate a motion vector for a macroblock 28 in the current frame 22, a macroblock 29 in the reference frame 21 is identified. The macroblock 29 is in the same position within the frame 21 as the macroblock 28 of interest is in the frame 22. Accordingly, the macroblock 28 and the macroblock 29 are said to be co-located. Further, a first plurality (window 26) of macroblocks in the current frame 22 that neighbor the macroblock 28 is identified, and a second plurality (window 27) of macroblocks in the reference frame 21 that neighbor the macroblock 29 in the reference frame 21 is also identified. In one embodiment, the window 27 is in the same position within the frame 21 as the window 26 is in the frame 22. Accordingly, the window 26 and the window 27 are also said to be co-located. In general, the term "co-located" is used to describe a region (e.g., a macroblock or a window of macroblocks) of one frame and a corresponding region in another frame that are in the same positions within their respective frames. A pair of co-located macroblocks 108 and 109 is also indicated; that is, macroblock 108 is at a position within window 27 that is the same as the position of macroblock 109 within window 26.

In general, according to embodiments, a motion vector can be estimated for any macroblock of interest in the frame 22 by considering the properly received motion vectors associated with macroblocks in the current frame 22 that neighbor the macroblock of interest, and by considering the properly received motion vectors associated with macroblocks in the reference frame 21 that neighbor a macroblock that is co-located with the macroblock of interest.

In one embodiment, the array of macroblocks in the window 26 surrounds the macroblock 28 of interest. In one such embodiment, the window 26 and the window 27 each include a 3×3 array of macroblocks. Windows of different dimensions, including windows that are not square-shaped, can be selected. Also, a window does not necessarily have to surround the macroblock of interest, in particular for those instances in which the macroblock of interest is at the edge of a frame.

Figure 3:
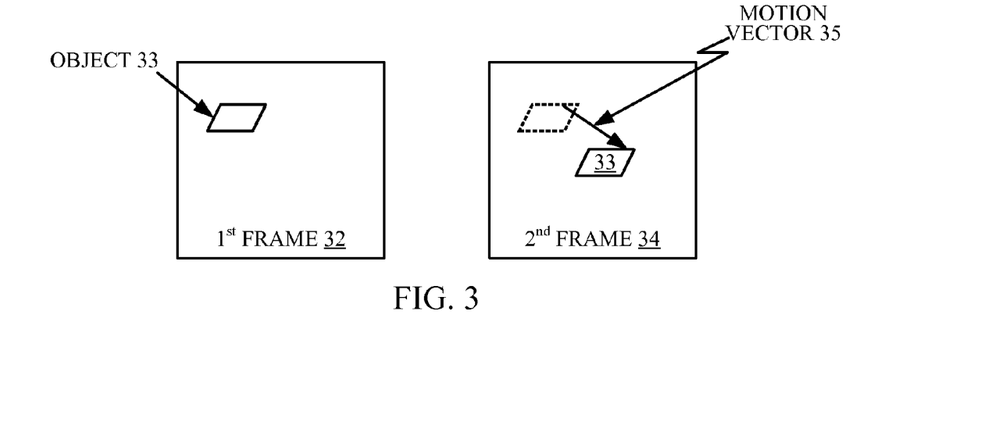
FIG. 3 illustrates an example of two image frames showing the motion of an object from one frame to the next.

FIG. 3 illustrates two consecutive image frames (a first frame 32 and a second frame 34) according to one embodiment. In the example of FIG. 3, the second frame 34 follows the first frame 32 in display order. In an MPEG compression scheme, the first frame 32 can correspond to, for example, an I-frame or a P-frame, and the second frame 34 can correspond to, for example, a P-frame. In general, the first frame 32 and the second frame 34 are "inter-coded" (e.g., inter-coded frames are encoded dependent on other frames).

In the example of FIG. 3, an object 33 is located at a certain position within the first frame 32, and the same object 33 is located at a different position within the second frame 34. The MPEG compression scheme works by encoding the differences between frames. A motion vector 35 is used as the simplest way of communicating the change in the image between the frames 32 and 34; that is, the image of the object 33 does not have to be sent again just because it moved. In a similar manner, a motion vector can be associated with a macroblock in a frame (e.g., the macroblock 23 of FIG. 2).

Figure 4:
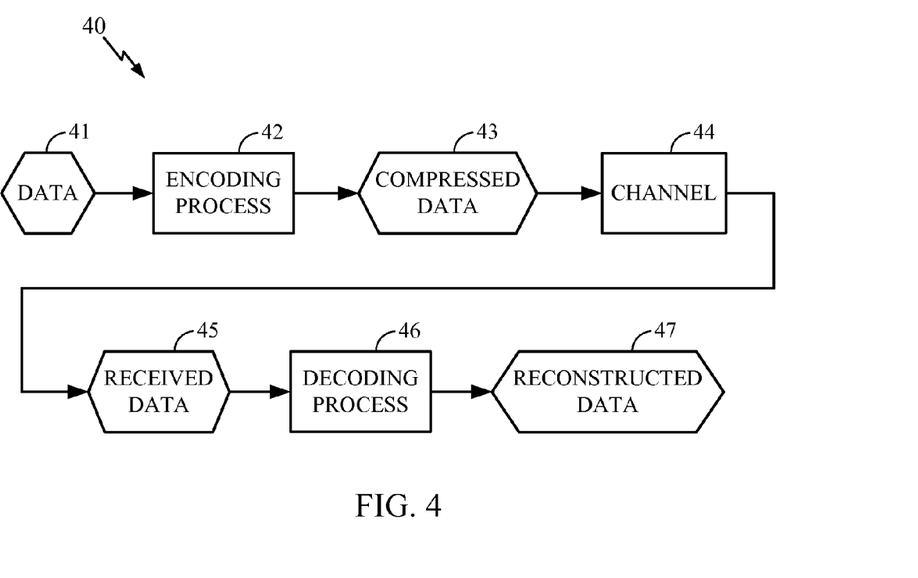
FIG. 4 is a data flow diagram showing the flow of data from a data encoding process to a data decoding process.

FIG. 4 is a data flow diagram 40 showing the flow of data from an encoder to a decoder according to one embodiment. In an encoder, an encoding process 42 compresses (encodes) data 41 using an encoding scheme such as MPEG-1, MPEG-2, MPEG-4, H.261, H.263 or H.264. The compressed data 43 is sent from the encoder to a decoder (e.g., the system 10 of FIG. 1) via the channel 44, which may be a wired or wireless channel. The received data 45 may include both properly received data and corrupted data. Also, some data may also be lost during transmission or may arrive late at the decoder. The decoding process 46 decompresses (reconstructs) the received data 45 to generate the reconstructed data 47.

Figure 5:
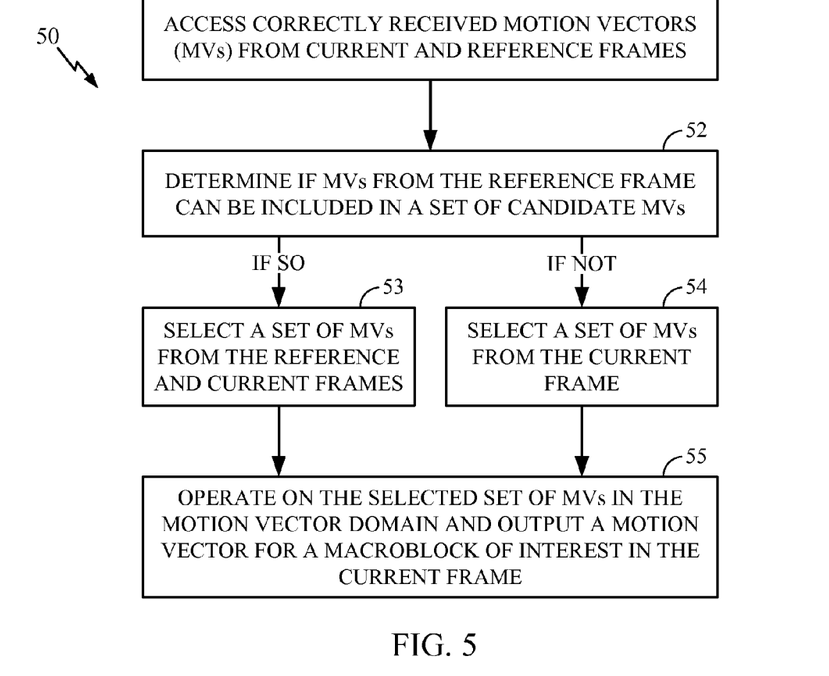
FIG. 5 is a flowchart of a motion vector domain-based temporal error concealment method.

FIG. 5 is a flowchart 50 of one embodiment of a motion vector domain-based temporal error concealment method. Although specific steps are disclosed in the flowchart 50 of FIG. 5 (as well as in the flowcharts 70, 90, 100, 110 and 130 of FIGS. 7, 9, 10, 11 and 13, respectively), such steps are exemplary. That is, other embodiments may be formulated by performing various other steps or variations of the steps recited in the flowcharts 50, 70, 90, 100, 110 and 130. It is appreciated that the steps in the flowcharts 50, 70, 90, 100, 110 and 130 may be performed in an order different than presented, and that the steps in the flowcharts 50, 70, 90, 100, 110 and 130 are not necessarily performed in the sequence illustrated.

Figure 6:
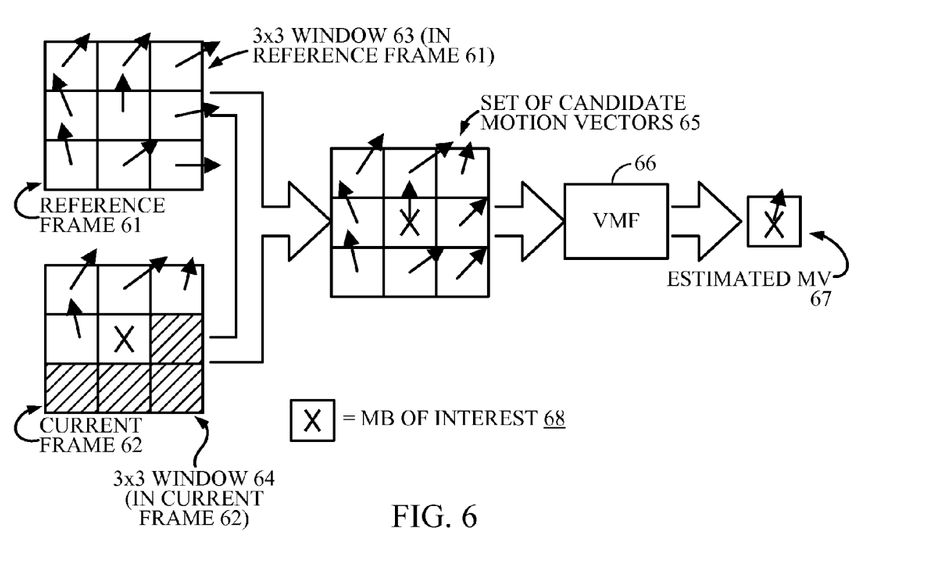
FIG. 6 illustrates the flow of information according to the method of FIG. 5.

FIG. 5 is described with reference also to FIG. 6. FIG. 6 shows a 3×3 window 63 of macroblocks selected from a reference frame 61, and a 3×3 window 64 of macroblocks selected from a current frame 62. It is understood that the reference frame 61 and the current frame 62 each include macroblocks in addition to the macroblocks included in the windows 63 and 64, respectively.

The window 63 and the window 64 are co-located. In the present embodiment, the macroblock (MB) 68 of interest—that is, the macroblock for which a motion vector is to be estimated—lies at the center of the window 64, but as mentioned above, that does not have to be the case.

It is understood that the windows 63 and 64 can be other than 3×3 windows. For instance, 5×5 windows may be used. Also, if the macroblock of interest is along one edge of the current frame 62, then a window that is not square in shape (e.g., a 3×2 or a 2×3 window) may be used.

In one embodiment, the reference frame 61 precedes the current frame 62 in display order. In another embodiment, the reference frame 61 may be a frame that comes after the current frame 62 in display order; that is, the reference frame 61 may be a "future frame." In yet another embodiment, both the frame preceding the current frame 62 and the future frame following the current frame 62 may be considered for the error concealment methods described herein.

The use of a future frame may introduce delays into the decoding process. However, in applications in which delays can be tolerated, motion vectors from a future frame may be used for error concealment. Also, motion vectors from a future frame may be used in instances in which the current frame 62 is the first frame in a sequence of frames (e.g., an I-frame).

In overview, one of the objectives of the method of the flowchart 50 is to intelligently select a set 65 of candidate motion vectors from the properly received motion vectors that are associated with the macroblocks of the frames 61 and 62. In one embodiment, once the set 65 of candidate motion vectors is identified, a vector median filter (VMF) 66 is applied to the vectors in the set 65. The output of the VMF 66 is an estimated motion vector (MV) 67 for the macroblock 68 of interest.

In one embodiment, in a block 51 of FIG. 5, the windows 63 and 64 are identified. Correctly received motion vectors associated with the macroblocks in the window 63, and correctly received motion vectors associated with the macroblocks in the window 64, are accessed.

In a block 52, in one embodiment, a determination is made as to whether motion vectors in the reference frame 61 (specifically, in the window 63) are eligible to be included in the set 65 of candidate motion vectors. Embodiments of methods used to make this determination are described in conjunction with FIGS. 7, 8, 9 and 10, below.

In a block 53 of FIG. 5, in one embodiment, if motion vectors in the reference frame can be included in the set 65 of candidate motion vectors, then motion vectors from the window 63 and from the window 64 are intelligently selected and included in the set 65. Embodiments of methods used to select motion vectors from the windows 63 and 64 are described in conjunction with FIGS. 11, 12, 13 and 14, below.

In a block 54 of FIG. 5, in one embodiment, if motion vectors in the reference frame are not eligible to be included in the set 65 of candidate motion vectors, then only motion vectors from window 64 are selected and included in the set 65. Note that it is possible that there may be instances in which the window 64 contains no properly received motion vectors. The method of FIGS. 7 and 8 can be used to address those instances.

In a block 55 of FIG. 5, in one embodiment, a statistical measure of the set 65 of candidate motion vectors is determined. The statistical measure defines a motion vector 67 for the macroblock 68 of interest. The motion vector 67 can then be applied to the macroblock 68 of interest.

In one embodiment, the statistical measure is the median of the set 65 of candidate motion vectors. In one such embodiment, the median (specifically, the median vector) of the set 65 is determined, as follows.

For an array of N m-dimensional vectors, $V=(\vec{v}_1, \vec{v}_2, \ldots, \vec{v}_N)$, with $\vec{v}_i \in \Re^n$, for $i=1, 2, \ldots, N$, the median vector $\vec{v}_{VM}$ is the vector that satisfies the following constraint:

$$\sum_{i=1}^{N} \|\vec{v}_{VM} - \vec{v}_i\|_p \le \sum_{i=1}^{N} \|\vec{v}_j - \vec{v}_i\|_p; \; j=1, 2, \ldots, N;$$

where p denotes the p-norm metrics between the vectors. For simplicity, in one embodiment, p=1 is used. For a two-dimensional vector $\vec{v}=(v(x), v(y))$, the 1-norm distance between $\vec{v}_0$ and $\vec{v}_1$ is:

$$\|\vec{v}_0 - \vec{v}_1\|_{p=1} = |v_0(x) - v_1(x)| + |v_0(y) - v_1(y)|.$$

Thus, in one embodiment, the estimated motion vector 67 for the macroblock 68 of interest is the median of the set 65 of candidate motion vectors. Statistical measures of the set 65 of candidate motion vectors other than the median can be determined and used for the estimated motion vector 67. For example, the average of the set 65 can be determined and used.

In general, a set 65 of candidate motion vectors is identified. The set 65 is then operated on in some manner to determine an estimated motion vector 67 for the macroblock 68 of interest. The estimated motion vector 67 may be one of the motion vectors in the set 65, or the estimated motion vector 67 may be a motion vector determined by operating on the set 65.

Significantly, the estimated motion vector 67 is determined in the motion vector domain and not in the pixel domain. Specifically, pixel values are not used for error concealment, and distortion values associated with each of the candidate motion vectors are not calculated for error concealment. Accordingly, computational complexity and associated decoding delays are reduced. Also, there is no need to access the frame buffer to retrieve pixel values, eliminating that source of additional decoding delays. Furthermore, by intelligently selecting motion vectors to be included in the set 65 of candidate motion vectors, peak signal-to-noise ratios (PSNRs) comparable to if not better than the PSNRs associated with pixel-based error concealment techniques are achieved.

Figure 7:
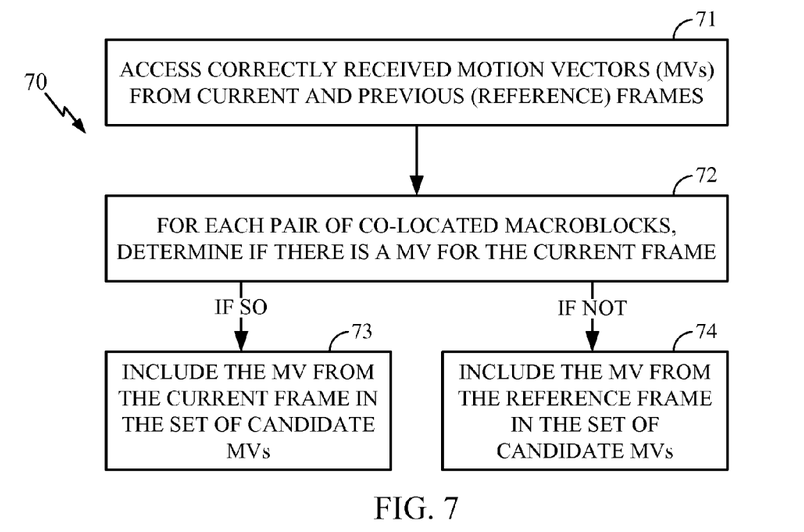
FIG. 7 is a flowchart of a method for selecting candidate motion vectors used in a motion vector domain-based temporal error concealment process.

FIG. 7 is a flowchart 70 of one embodiment of a method for selecting candidate motion vectors used in a motion vector domain-based temporal error concealment process. Flowchart 70 describes one embodiment of a method for implementing blocks 52, 53 and 54 of FIG. 5. FIG. 7 is described with reference also to FIG. 8.

Figure 8:
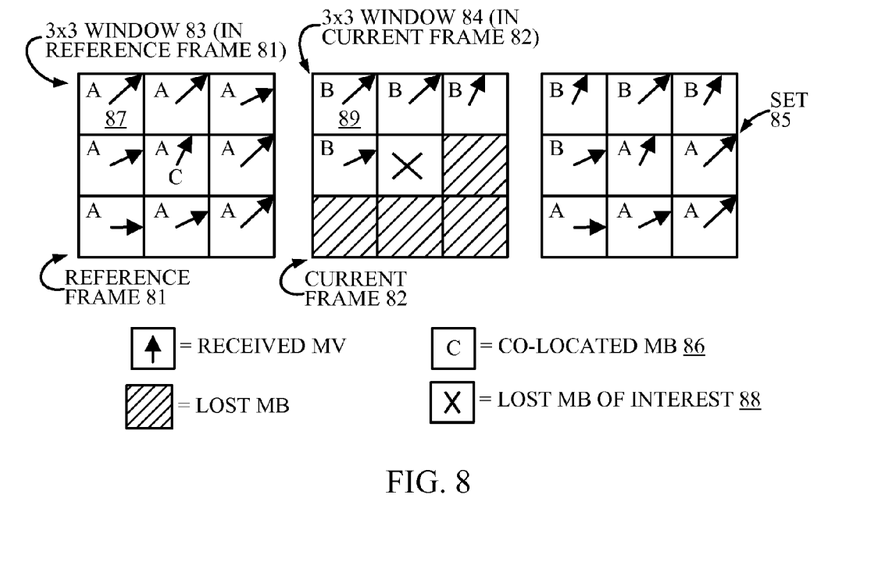
FIG. 8 illustrates the flow of information according to the method of FIG. 7.

In one embodiment, in a block 71 of FIG. 7, the window 83 (in a reference frame 81) and the window 84 (in the current frame 82) are identified. It is understood that the reference frame 81 and the current frame 82 each include macroblocks in addition to the macroblocks included in the windows 83 and 84, respectively.

Properly received motion vectors associated with the macroblocks in the window 83, and properly received motion vectors associated with the macroblocks in the window 84, can then be accessed. Properly received motion vectors in the window 83 are identified using a letter A, while properly received motion vectors in the window 84 are identified using a letter B.

In a block 72, for each pair of co-located macroblocks within the windows 83 and 84, a determination is made as to whether there is a properly received motion vector for the macroblock in the window 84.

In a block 73, if there is a properly received motion vector for a macroblock in the window 84, that motion vector is included in the set 85 of candidate motion vectors, and the motion vector for the co-located macroblock in the window 83 is not included in the set 85. For example, there is a properly received motion vector for the macroblock 87 (in the window 83 in the reference frame 81) and a properly received motion vector for the macroblock 89 (in the window 84 in the current frame 82). According to one embodiment, the motion vector associated with the macroblock 89 (current frame 82) is included in the set 85, and the motion vector associated with the macroblock 87 (reference frame 81) is not included in the set 85.

In a block 74, if there is not a properly received motion vector for a macroblock in the window 84, then the motion vector for the co-located macroblock in the window 83 is included in the set 85 of candidate motion vectors. For example, there is not a properly received motion vector for the macroblock 88 of interest, and so the motion vector associated with the co-located macroblock 86 (in the reference frame 81) is included in the set 85.

As described above, a statistical measure of the set 85 of candidate motion vectors is determined (refer to the discussion of FIGS. 5 and 6).

In some instances, motion from one frame to the next frame may not be continuous. For example, a reference frame may include one type of motion, while motion in the current frame may have changed direction or stopped. Furthermore, an object in a reference frame may move out of the neighborhood of a macroblock of interest, and so it may not be suitable to include a motion vector for that object in the set of candidate motion vectors.

Figure 9:
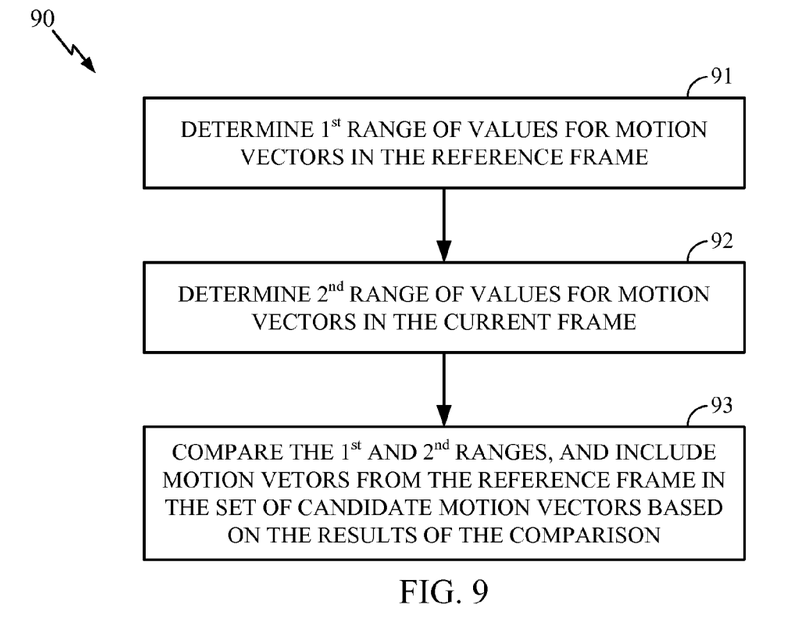
FIG. 9 is a flowchart of a method for detecting frame-to-frame motion change and used for selecting candidate motion vectors used in a motion vector domain-based temporal error concealment process.
Figure 10:
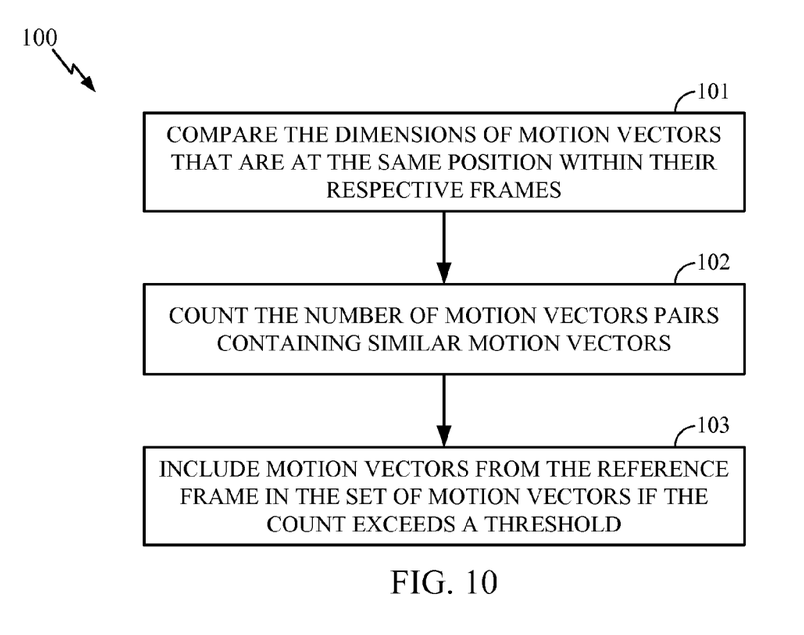
FIG. 10 is a flowchart of another method for detecting frame-to-frame motion change and used for selecting candidate motion vectors used in a motion vector domain-based temporal error concealment process.

FIG. 9 is a flowchart 90 of one embodiment of a method for detecting frame-to-frame motion change. FIG. 10 is a flowchart 100 of another embodiment of a method for detecting frame-to-frame motion change. Either or both of the methods of the flowcharts 90 and 100 can be used to determine whether motion vectors from a reference frame should be included in the set of candidate motion vectors, in order to address the points mentioned in the preceding paragraph.

With reference first to FIG. 9, the flowchart 90 describes one embodiment of a method for implementing the block 52 of FIG. 5. In a block 91, a first range of values for motion vectors associated with a reference frame is determined. In a block 92, a second range of values for motion vectors associated with the current frame is determined. In a block 93, the first and second ranges of values are compared, and the motion vectors associated with the reference frame are included in the set of candidate motion vectors according to the results of the comparison.

FIG. 9 is described further with reference also to FIG. 2. In the block 91, in one embodiment, motion vector statistics are calculated for the properly received motion vectors associated with the reference frame 21.

In the block 92, in one embodiment, motion vector statistics are calculated for the properly received motion vectors associated with the current frame 22.

In one embodiment, all of the motion vectors associated with the reference frame 21 and the current frame 22 are included in the calculations of motion vector statistics. In another embodiment, only subsets of the motion vectors are used instead of all of the motion vectors. In the latter embodiment, for example, the subsets may include only the motion vectors associated with macroblocks for which motion vectors for both frames were properly received. That is, for example, a motion vector for a macroblock in the reference frame 21 is only included in a first subset if the motion vector for the co-located macroblock in the current frame 22 was also properly received. Similarly, a motion vector for a macroblock in the current frame 22 is only included in a second subset if the motion vector for the co-located macroblock in the reference frame 21 was also properly received.

In one embodiment, for each frame, the statistics calculated include the mean and standard deviation of the motion vector dimensions (magnitude/length and direction/angle). Let I be the set of indices of the motion vectors $\vec{v}$ that are included in the calculations of motion vector statistics, and let M be the size of the set I. Then the means and standard deviations (std) for the magnitudes (mag) and angles (ang) are calculated as follows for the reference frame 21 and the current frame 22:

$$mean_{mag\_frm} = \frac{1}{M} \sum_{i \in I} mag(\vec{v}_{frm}(i));$$

$$mean_{ang\_frm} = \frac{1}{M} \sum_{i \in I} ang(\vec{v}_{frm}(i));$$

$$std_{mag\_frm} = \sqrt{\frac{1}{M} \sum_{i \in I} (mag(\vec{v}_{frm}(i)) - mean_{mag\_frm})^2} ; \text{ and}$$

$$std_{ang\_frm} = \sqrt{\frac{1}{M} \sum_{i \in I} (ang(\vec{v}_{frm}(i)) - mean_{ang\_frm})^2} ;$$

where the subscript "frm" refers to either the current frame or the reference frame. Once the means and standard deviations are calculated, the ranges ($mean_{mag\_frm} - std_{mag\_frm}$, $mean_{mag\_frm} + std_{mag\_frm}$) and ($mean_{ang\_frm} - std_{ang\_frm}$, $mean_{ang\_frm} + std_{ang\_frm}$) are formed for each of the current and reference frames.

In the block 93, in one embodiment, the ranges of the motion vector magnitudes for the reference frame 21 and for the current frame 22 are compared, and the ranges of the motion vector angles for the reference frame 21 and for the current frame 22 are also compared. In one embodiment, if the range of motion vector magnitudes for the reference frame 21 overlaps the range of motion vector magnitudes for the current frame 22, and if the range of motion vector angles for the reference frame 21 overlaps the range of motion vector angles for the current frame 22, then the reference frame 21 and the current frame 22 are judged to have similar motion. Accordingly, motion vectors from the reference frame 21 are eligible for inclusion in the set of candidate motion vectors (e.g., the set 65 of FIG. 6).

With reference now to FIG. 10, the flowchart 100 describes another embodiment of a method for implementing the block 52 of FIG. 5. In a block 101, the dimensions of pairs of motion vectors are compared to determine whether motion vectors in each of the pairs are similar to each other. Each of the pairs of motion vectors includes a first motion vector associated with a first macroblock at a position in a reference frame, and a second motion vector associated with a second macroblock at the position in the current frame.

In a block 102, the number of pairs of motion vectors in the reference and current frames that are similar is counted. In a block 103, motion vectors from the reference frame are eligible for inclusion in the set of candidate motion vectors if the number exceeds a threshold.

FIG. 10 is described further with reference also to FIG. 2. In the block 101, in one embodiment, the dimensions of each pair of co-located macroblocks are compared. The macroblocks 108 and 109 of FIG. 2 are an example of a pair of co-located macroblocks.

In one embodiment, to facilitate the comparison, each received motion vector in the reference frame 21 and each received motion vector in the current frame 22 is given a magnitude label and a direction label. In one such embodiment, the magnitude label has a value of either zero (0) or one (1), depending on its relative magnitude. For example, a motion vector having a magnitude of less than or equal to two (2) pixels is assigned a magnitude label of 0, and a motion vector having a magnitude of more than 2 pixels is assigned a magnitude label of 1. In one embodiment, the direction label has a value of 0, 1, 2 or three (3). For example, relative to a vertical line in a frame, a motion vector having an angle greater than or equal to −45 degrees but less than 45 degrees could be assigned a direction label of 0, a motion vector having an angle greater than or equal to 45 degrees but less than 135 degrees could be assigned a direction label of 1, and so on. Other schemes for labeling the magnitude and direction of motion vectors can be used.

In one embodiment, for each pair of co-located macroblocks, the magnitude labels of the 2 motion vectors in the pair are compared, and the direction labels of the 2 motion vectors in the pair are compared. In one embodiment, if the magnitude labels are the same and the direction labels are not opposite for the 2 motion vectors in a pair, then that pair of motion vectors is defined as being similar. Note that, in the present embodiment, the direction labels do not necessarily have to be the same in order for the 2 motion vectors in a pair to be considered similar. For example, using the scheme described above, a direction label of 0 would be considered similar to a direction label of 0, 1 or 3, but opposite to a direction label of 2. Other rules defining what constitutes similar motion vectors can be used.

In the block 102 of FIG. 10, in one embodiment, the number of pairs of co-located macroblocks that contain similar motion vectors is counted. In other words, the number of pairs of similar motion vectors is counted.

In the block 103, in one embodiment, motion vectors from the reference frame 21 are eligible for inclusion in the set of candidate motion vectors (e.g., the set 65 of FIG. 6) if the count made in the block 102 exceeds a threshold. In one embodiment, the threshold is equal to one-half of the number of macroblocks in either of the two frames 21 or 22.

Figure 11:
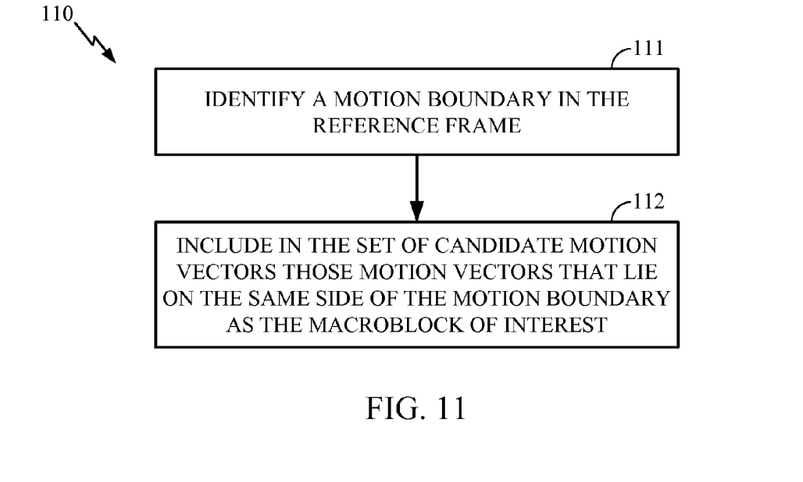
FIG. 11 is a flowchart of a method for locating a motion boundary within a frame and used for selecting candidate motion vectors used in a motion vector domain-based temporal error concealment process.

In the neighborhood of a macroblock of interest, there may be a motion boundary—objects on one side of a motion boundary may move differently from objects on the other side of the motion boundary. FIG. 11 is a flowchart 110 of one embodiment of a method for locating a motion boundary. The flowchart 110 describes one embodiment of a method of implementing the block 53 of FIG. 5. Note that, in one embodiment, the block 53 (and hence the method of the flowchart 110) is implemented depending on the outcome of the block 52 of FIG. 5.

In a block 111 of FIG. 11, a motion boundary is identified in a reference frame. In a block 112, the set of candidate motion vectors includes only those motion vectors that are associated with macroblocks in the reference frame that lie on the same side of the motion boundary as a macroblock in the reference frame that is co-located with a macroblock of interest in the current frame.

Figure 12:
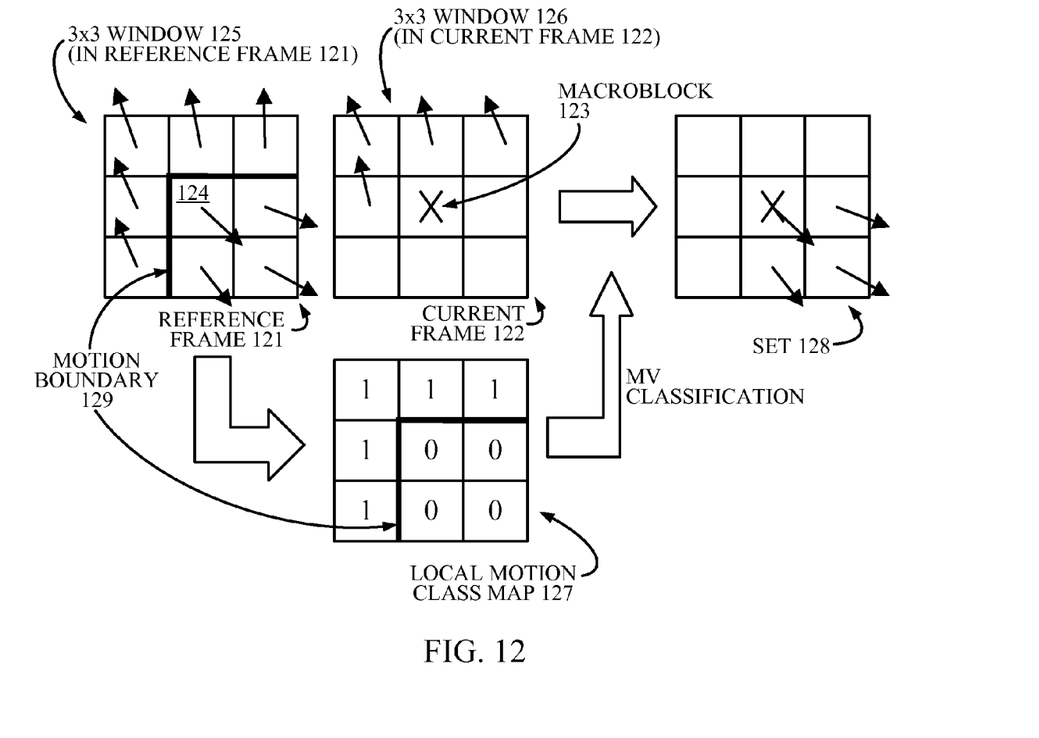
FIG. 12 illustrates the flow of information according to the method of FIG. 11.

FIG. 11 is described further with reference also to FIG. 12. FIG. 12 shows a window 125 in a reference frame 121, and a window 126 in a current frame 122. It is understood that the reference frame 121 and the current frame 122 each include macroblocks in addition to the macroblocks included in the windows 125 and 126, respectively.

In one embodiment, in the block 111, a motion boundary 129 is identified in the reference frame 121. In one embodiment, the motion boundary 129 is identified in the following manner. Each of the motion vectors associated with the macroblocks in the window 125 in the reference frame 121 is assigned a magnitude label and a direction label. The discussion above in conjunction with FIG. 10 describes one method for labeling motion vectors.

The motion vector associated with the macroblock 124 in the reference frame 121 that is at the same position as the macroblock 123 of interest in the current frame 122 is classified as class 0. That is, the macroblock 124 is co-located with the macroblock 123 of interest, and as such, the motion vector associated with the macroblock 124 is identified as being the first member of a particular class (e.g., class 0).

The magnitude labels of the other motion vectors associated with the window 125 are each compared to the magnitude label of the motion vector associated with the macroblock 124, and the direction labels of the other motion vectors in the window 125 are each compared to the direction label of the motion vector associated with the macroblock 124.

In one embodiment, if the magnitude label for a motion vector is the same as that of the motion vector associated with the macroblock 124, and if the angle label for that motion vector is not opposite that of the motion vector associated with the macroblock 124, then that motion vector is defined as being similar to the motion vector associated with the macroblock 124, and that motion vector is also classified as class 0. As mentioned, the process just described is repeated for each motion vector associated with the window 125, to generate the local motion class map 127.

In one embodiment, in the block 112, only those motion vectors associated with the window 125 that are in the same class as the motion vector associated with the macroblock 124 are included in the set 126 of candidate motion vectors. In other words, in the present embodiment, only the motion vectors in the window 125 in the reference frame 121 that are on the same side of the motion boundary 129 as the macroblock 124 (the macroblock co-located with the macroblock 123 of interest) are included in the set 128 of candidate motion vectors. That is, in the example of FIG. 12, only the motion vectors classified as class 0 are included in the set 128. As described above, a statistical measure of the set 128 of candidate motion vectors is then determined (refer to the discussion of FIGS. 5 and 6).

Note that properly received motion vectors associated with the window 126 of the current frame 122 can also be included in the set 128 if they are associated with macroblocks that also lie on the same side of the motion boundary as the macroblock 123 of interest. For example, after the map 127 is determined, the macroblocks in the window 126 that are co-located with those macroblocks in the window 127 that are classified as class 0 can also be classified as class 0, and the motion vectors associated with those macroblocks in the window 126 can be included in the set 128.

Figure 13:
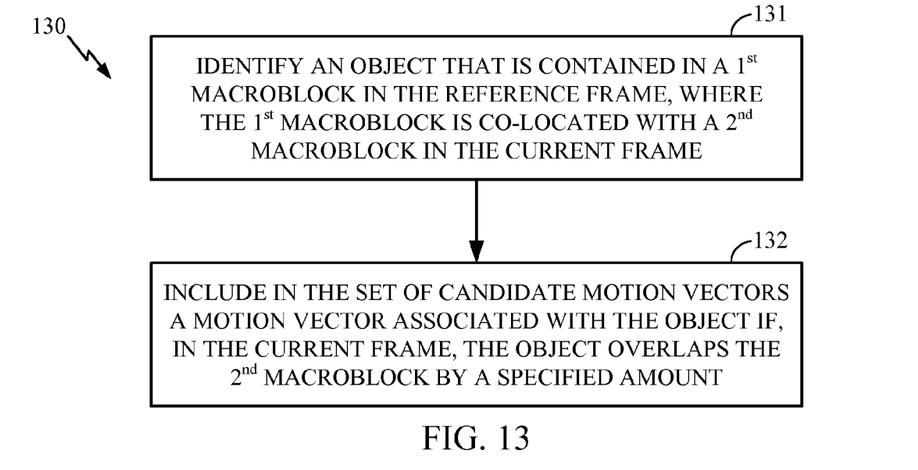
FIG. 13 is a flowchart of a method that uses the trajectory of a moving object to select a candidate motion vector used in a motion vector domain-based temporal error concealment process.

FIG. 13 is a flowchart 130 of one embodiment of a method that uses the trajectory of a moving object to select a candidate motion vector. The flowchart 130 describes one embodiment of a method of implementing the block 53 of FIG. 5.

In a block 131 of FIG. 13, an object in a first macroblock in a reference frame is identified. In a block 132, a motion vector associated with the object is included in the set of candidate motion vectors if the object sufficiently overlaps a co-located second macroblock in the current frame (that is, the first macroblock and the second macroblock are in the same position within their respective frames).

Figure 14:
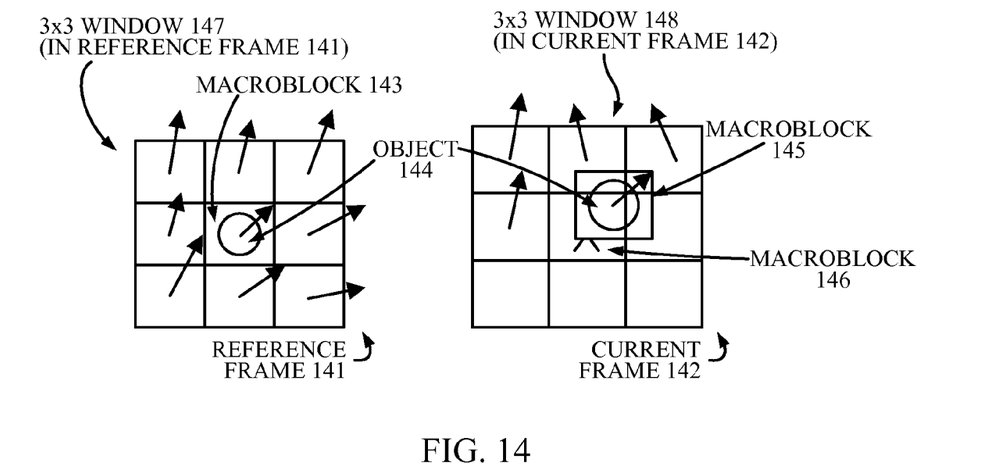
FIG. 14 illustrates the method of FIG. 13.

FIG. 13 is described further with reference also to FIG. 14. FIG. 14 shows a window 147 of a reference frame 141 and a window 148 of a current frame 142. The macroblock 143 is co-located with the macroblock 146. It is understood that the reference frame 141 and the current frame 142 each include macroblocks in addition to the macroblocks included in the windows 147 and 148, respectively.

In the block 131, in one embodiment, an object 144 within the reference frame, and associated with the macroblock 143 that is co-located with the macroblock 146, is identified. In the current frame 142, the object 144 has moved to a different position, and is now associated with a macroblock 145.

In the block 132, in one embodiment, a determination is made as to whether the macroblock 145 that contains the object 144 overlaps the macroblock 146 by a sufficient amount. If so, the motion vector associated with the object 144 can be included in the set of candidate motion vectors (e.g., the set 65 of FIG. 6). If not, the motion vector associated with the object 144 is not included in the set.

Note that method described in conjunction with FIGS. 13 and 14 can be similarly applied to any of the macroblocks within the windows 147 and 148. That is, although described for the center macroblock of the windows 147 and 148, the present invention is not so limited.

In one embodiment, an overlap of greater than or equal to 25 percent is considered sufficient. Various techniques can be used to determine whether the macroblock 145 overlaps the macroblock 146 by that amount. In one embodiment, the macroblocks 145 and 146 are each associated with a set of two-dimensional coordinates that define their respective positions within the current frame 142. Using these coordinates, for example, the corners of one of the macroblocks 145 and 146 can be compared to the midpoints of the sides of the other macroblock to determine whether the amount of overlap exceeds 25 percent. Thresholds other than 25 percent can be used.

The embodiments of FIGS. 9-14 have been described separately in order to more clearly describe certain aspects of the embodiments; however, it is appreciated that the embodiments may be implemented by combining different aspects of these embodiments. In one embodiment, one of the methods described in conjunction with FIGS. 9 and 10 is combined with one of the methods described in conjunction with FIGS. 11-14.

In summary, embodiments in accordance with the present invention provide methods and systems for temporal error concealment using motion vectors in the motion vector domain rather than pixel values in the pixel domain. Accordingly, computational complexity is reduced because distortion evaluations can be eliminated with regard to error concealment; the number of computation steps may be reduced by as much as 85 percent. Decoding delays are reduced from one frame to one slice of macroblocks; that is, in order to use neighboring motion vectors to estimate an absent motion vector, processing of only a slice (e.g., one row) of macroblocks may be delayed. Memory access times, and associated decoding delays, are reduced because memory accesses to retrieve pixel values can be eliminated with regard to error concealment. Yet the embodiments described herein yield PSNRs that are comparable to if not better than PSNRs associated with pixel-based error concealment techniques. Furthermore, embodiments can be implemented without having to make hardware changes.

The concepts described herein can be used for applications other than error concealment. For instance, embodiments can be used in motion estimation at an encoder. For example, in conventional hierarchical motion estimation, motion vectors found in the lowest spatial resolution are used as initial estimates of motion vectors for higher resolutions. Instead, motion vectors selected as described above can be used as the initial estimates to speed up motion estimation at the encoder.

Embodiments of the present invention are thus described. While the present invention has been described by the various different embodiments, it should be appreciated that the present invention should not be construed as limited by such embodiments, but rather construed according to the below claims.

What is claimed is:

1. A method of processing video data, the method comprising:
   determining that a motion vector for a macroblock of interest in a current frame was not properly received at a computing device; and
   estimating, via the computing device, the motion vector for the macroblock of interest in the current frame, wherein estimating the motion vector for the macroblock of interest in the current frame includes:
   identifying a set of candidate motion vectors from potential candidate motion vectors associated with macroblocks of the current frame and macroblocks of at a reference frame, wherein identifying the set of candidate motion vectors includes:
   identifying as the potential candidate motion vectors, motion vectors associated with macroblocks that neighbor the macroblock of interest in the current frame and motion vectors associated with macroblocks that neighbor a macroblock in the reference frame co-located with the macroblock of interest in the current frame,
   assigning magnitude labels and direction labels to the potential candidate motion vectors indicative of a relative magnitude and angle of each of the potential candidate motion vectors based on the motion vector magnitudes and motion vector angles,
   comparing the magnitude labels and the direction labels between motion vectors of co-located pairs of macroblocks in the reference frame and in the current frame to determine whether the motion vectors of the reference frame are eligible for inclusion in the set of candidate motion vectors, and selecting as the set of candidate motion vectors, the potential candidate
   motion vectors if the motion vectors from the reference frame are eligible for inclusion, otherwise selecting as the set of candidate motion vectors, the motion vectors of the current frame; and
   determining, via the computer device, a statistical measure of the set of candidate motion vectors, wherein the estimating of the motion vector for the macroblock of interest in the current frame is based on the statistical measure.

2. The method of claim 1, further comprising:
counting the co-located pairs that are similar; and
determining whether the motion vectors of the reference frame are eligible for inclusion in the set of candidate motion vectors based on whether the counting exceeds a specified threshold.

3. The method of claim 1, further comprising:
  determining a motion boundary associated with the reference frame, wherein determining the motion boundary includes:
    comparing the magnitude labels and the direction labels of the motion vectors of the reference frame to the magnitude label and direction label of the motion vector associated with the macroblock in the reference frame that is co-located with the macroblock of interest in the current frame, and
    determining, based on the comparison, whether the motion vectors of the reference frame lie on the same side of the motion boundary as the motion vector associated with the macroblock in the reference frame that is co-located with the macroblock of interest in the current frame; and
  determining whether the motion vectors of the reference frame are eligible for inclusion in the set of candidate motion vectors based on the side of the motion boundary in which the motion vectors of the reference frame lie.

4. The method of claim 1, further comprising:
  determining the presence of an object in the macroblock in the reference frame that is co-located with the macroblock of interest in the current frame; and
  determining whether a motion vector associated with the object is eligible for inclusion in the set of candidate motion vectors based on the amount of overlap of a macroblock with the object in the current frame and the macroblock of interest in the current frame.

5. A System comprising:
  means for determining that a motion vector for a macroblock of interest in a current frame was not properly received; and
  means for estimating the motion vector for the macroblock of interest in the current frame, wherein means for estimating the motion vector for the macroblock of interest in the current frame includes:
    means for identifying a set of candidate motion vectors from potential candidate motion vectors associated with macroblocks of the current frame and macroblocks of a reference frame, wherein means for identifying the set of candidate motion vectors includes:
      means for identifying as the potential candidate motion vectors, motion vectors associated with macroblocks that neighbor the macroblock of interest in the current frame and motion vectors associated with macroblocks that neighbor a macroblock in the reference frame co-located with the macroblock of interest in the current frame,
      means for assigning magnitude labels and direction labels to the potential candidate motion vectors indicative of a relative magnitude and angle of each of the potential candidate motion vectors,
      means for comparing the magnitude labels and the direction labels between motion vectors of co-located pairs of macroblocks in the reference frame and in the current frame to determine whether the motion vectors of the reference frame are eligible for inclusion in the set of candidate motion vectors, and
      means for selecting as the set of candidate motion vectors, the potential candidate motion vectors if the motion vectors from the reference frame are eligible for inclusion, otherwise selecting as the set of candidate motion vectors, the motion vectors of the current frame; and
    means for determining a statistical measure of the set of candidate motion vectors,
  wherein the estimating of the motion vector for the macroblock of interest in the current frame is based on the statistical measure.

6. The system of claim 5, further comprising:
  means for counting the co-located pairs that are similar; and
  means for determining whether the motion vectors of the reference frame are eligible for inclusion in the set of candidate motion vectors based on whether the counting exceeds a specified threshold.

7. The system of claim 5, further comprising:
  means for determining a motion boundary associated with the reference frame, wherein the means for determining the motion boundary include:
    means for comparing the magnitude labels and the direction labels of the motion vectors of the reference frame to the magnitude label and direction label of the motion vector associated with the macroblock in the reference frame that is co-located with the macroblock of interest in the current frame, and
    means for determining, based on the comparison, whether the motion vectors of the reference frame lie on the same side of the motion boundary as the motion vector associated with the macroblock in the reference frame that is co-located with the macroblock of interest in the current frame; and
  means for determining whether the motion vectors of the reference frame are eligible for inclusion in the set of candidate motion vectors based on the side of the motion boundary in which the motion vectors of the reference frame lie.

8. The system of claim 5, further comprising:
  means for determining the presence of an object in the macroblock in the reference frame that is co-located with the macroblock of interest in the current frame; and
  means for determining whether a motion vector associated with the object is eligible for inclusion in the set of candidate motion vectors based on the amount of overlap of a macroblock with the object in the current frame and the macroblock of interest in the current frame.

9. A device comprising a processor, wherein the processor is configured to:
  Determine that a motion vector for a macroblock of interest in a current frame was not properly received; and
  estimate the motion vector for the macroblock of interest in the current frame, wherein in estimating the motion vector for the macroblock of interest in the current flame the processor:
    identifies a set of candidate motion vectors from potential candidate motion vectors associated with macroblocks of the current flame and macroblocks of a reference frame, wherein in identifying the set of candidate motion vectors the processor;
    identifies as the potential candidate motion vectors, motion vectors associated with macroblocks that neighbor the macroblock of interest in the current flame and motion vectors associated with macroblocks that neighbor a macroblock in the reference flame co-located with the macroblock of interest in the current frame,
    assigns magnitude labels and direction labels to the potential candidate motion vectors indicative of a relative magnitude and angle of each of the potential candidate motion vectors,
    compares the magnitude labels and the direction labels between motion vectors of co-located pairs of macroblocks in the reference flame and in the current flame to determine whether the motion vectors of the reference flame are eligible for inclusion in the set of candidate motion vectors, and selects as the set of candidate motion vectors, the potential candidate motion vectors if the motion vectors from the reference frame are eligible for inclusion, otherwise selects as the set of candidate motion vectors, the motion vectors of the current frame; and determines a statistical measure of the set of candidate motion vectors, wherein the estimation of the motion vector for the macroblock of interest in the current frame is based on the statistical measure.

10. The device of claim 9, the processor being further configured to:
   count the co-located pairs that are similar; and
   determine whether the motion vectors of the reference frame are eligible for inclusion in the set of candidate motion vectors based on whether the counting exceeds a specified threshold.

11. The device of claim 9, the processor being further configured to:
   determine a motion boundary associated with the reference frame, wherein in determining the motion boundary the processor is configured to:
     compare the magnitude labels and the direction labels of the motion vectors of the reference frame to the magnitude label and direction label of the motion vector associated with the macroblock in the reference frame that is co-located with the macroblock of interest in the current frame, and
     determine, based on the comparison, whether the motion vectors of the reference frame lie on the same side of the motion boundary as the motion vector associated with the macroblock in the reference frame that is co-located with the macroblock of interest in the current frame; and
   determine whether the motion vectors of the reference frame are eligible for inclusion in the set of candidate motion vectors based on the side of the motion boundary in which the motion vectors of the reference frame lie.

12. The device of claim 9, the processor being further configured to:
   determine the presence of an object in the macroblock in the reference frame that is co-located with the macroblock of interest in the current frame; and
   determine whether a motion vector associated with the object is eligible for inclusion in the set of candidate motion vectors based on the amount of overlap of a macroblock with the object in the current frame and the macroblock of interest in the current frame.

13. A non-transitory computer readable storage medium comprising instructions that when executed by a processor cause the processor to:
   determine that a motion vector for a macroblock of interest in a current flame was not properly received; and
   estimate the motion vector for the macroblock of interest in the current flame, wherein in estimating the motion vector for the macro block of interest in the current frame the processor:
   identifies a set of candidate motion vectors from potential candidate motion vectors associated with macroblocks of the current flame and macroblocks of a reference frame, wherein in identifying the set of candidate motion vectors the processor;
   identifies as the potential candidate motion vectors, motion vectors associated with macroblocks that neighbor the macroblock of interest in the current flame and motion vectors associated with macroblocks that neighbor a macroblock in the reference flame co-located with the macroblock of interest in the current flame,
   assigns magnitude labels and direction labels to the potential candidate motion vectors indicative of a relative magnitude and angle of each of the potential candidate motion vectors,
   compares the magnitude labels and the direction labels between motion vectors of co-located pairs of macroblocks in the reference frame and in the
   current frame to determine whether the motion vectors of the reference frame are eligible for inclusion in the set of candidate motion vectors, and
   selects as the set of candidate motion vectors, the potential candidate motion vectors if the motion vectors from the reference frame are eligible for inclusion, otherwise selects as the set of candidate motion vectors, the motion vectors of the current frame; and
   determines a statistical measure of the set of candidate motion vectors, wherein the estimation of the motion vector for the macroblock of interest in the current is based on the statistical measure.

14. The computer readable medium of claim 13, further comprising instructions that cause the processor to:
   count the co-located pairs that are similar; and
   determine whether the motion vectors of the reference frame are eligible for inclusion in the set of candidate motion vectors based on whether the counting exceeds a specified threshold.

15. The computer readable medium of claim 13, further comprising instructions that cause the processor to:
   determine a motion boundary associated with the reference frame, wherein in determining the motion boundary the instructions cause the processor to:
     compare the magnitude labels and the direction labels of the motion vectors of the reference frame to the magnitude label and direction label of the motion vector associated with the macroblock in the reference frame that is co-located with the macroblock of interest in the current frame, and
     determine, based on the comparison, whether the motion vectors of the reference frame lie on the same side of the motion boundary as the motion vector associated with the macroblock in the reference frame that is co-located with the macroblock of interest in the current frame; and
   determine whether the motion vectors of the reference frame are eligible for inclusion in the set of candidate motion vectors based on the side of the motion boundary in which the motion vectors of the reference frame lie.

16. The computer readable medium of claim 13, further comprising instructions that cause the processor to:
   determine the presence of an object in the macroblock in the reference frame that is co-located with the macroblock of interest in the current frame; and
   determine whether a motion vector associated with the object is eligible for inclusion in the set of candidate motion vectors based on the amount of overlap of a macroblock with the object in the current frame and the macroblock of interest in the current frame.

17. The method of claim 1, wherein assigning the magnitude labels and direction labels comprises assigning, for each of the potential candidate motion vectors, a numeric value from a first set of numeric values indicative of the relative magnitude and another numeric value from a second set of numeric values indicative of the relative angle.

18. The system of claim 5, wherein the means for assigning the magnitude labels and direction labels comprise means for assigning, for each of the potential candidate motion vectors, a numeric value from a first set of numeric values indicative of the relative magnitude and another numeric value from a second set of numeric values indicative of the relative angle.

19. The device of claim 9, wherein in assigning the magnitude labels and direction labels, the processor is configured to assign, for each of the potential candidate motion vectors, a numeric value from a first set of numeric values indicative of the relative magnitude and another numeric value from a second set of numeric values indicative of the relative angle.

20. The computer readable medium of claim 13, wherein in assigning the magnitude labels and direction labels, the instructions cause the processor to assign, for each of the potential candidate motion vectors, a numeric value from a first set of numeric values indicative of the relative magnitude and another numeric value from a second set of numeric values indicative of the relative angle.

* * * * *